2,772,203
STABLE DENTAL CREAMS CONTAINING HIGHER ALIPHATIC ACYL AMIDE OF AMINOCARBOXYLIC ACID COMPOUND

Gerhard Martin Salzmann, Franklin Lakes, N. J., assignor to Colgate-Palmolive Company, Jersey City, N. J., a corporation of Delaware No Drawing. Application April 3, 1952,
Serial No. 280,360

9 Claims. (Cl. 167—93)

The present invention relates to dental creams or the like for the inhibition of caries which have excellent stability upon aging.

Dentifrice and like preparations used on the teeth and gums have been a partial aid in the cleaning of the teeth and mouth. From time to time various proposals have been advanced relative to the development of "antiseptic" dentifrices and the like having allegedly the property of inhibition of tooth decay. Until recently such claims were not substantiated by any factual evidence.

It is generally accepted at present that the decalcification of tooth enamel and the like characteristic of dental caries is caused to a large extent by the acids produced from the degradation or fermentation of suitable carbohydrates in the oral cavity. This breakdown of fermentable carbohydrates results from the action thereupon of certain micro-organisms including enzymes thereof, e. g. Lactobacilli, which are normally present in the oral cavity, such as in saliva.

From U. S. Patent No. 2,689,170, it is known that dental caries may be inhibited by suitable oral preparations containing certain higher fatty amides of amino carboxylic acid compounds as active ingredients. These oral dentifrices and the like are unique in their properties since they may be used in the ordinary or conventional manner and nevertheless inhibit the acid-producing effects of caries-active saliva for a prolonged period of time. Thus the active ingredients may be introduced into the oral cavity by brushing the teeth with suitable dental creams or the like once or twice a day for example, and the resulting prolonged retention or residual activity of these active ingredients in the oral cavity will be sufficient to inhibit the degradation or fermentation of subsequently ingested carbohydrates during the day, if not longer. According to this patent, the active ingredients are utilized in pure or substantially pure form. They should be free from soap or similar higher fatty acid material which tends to neutralize or substantially reduce the special characteristics which are exhibited by the specified amide compounds. More particularly, it is described therein that the amount of higher fatty acid material should be less than 15% by weight of the amide compound and insufficient to substantially adversely affect said amide, and preferably less than about 10% of said amide compound.

It has now been found that such dental creams or the like effective for the inhibition of dental caries and having improved stability upon aging may be obtained by formulations comprising (1) a polishing material selected from the group consisting of calcium- and magnesium-containing polishing agents, (2) a substantially saturated aliphatic acyl amide of a saturated aliphatic monoaminocarboxylic acid compound having 2 to 6 carbon atoms, the aliphatic acyl group having about 12 to 16 carbon atoms, and less than about 15% by weight based on said amide of higher fatty acid material, the amount of said material being insufficient to substantially adversely affect said amide, and characterized by (3) a calcium and magnesium ion suppression agent in an amount from about 0.1 to 5% by weight. By means of the present invention, dental creams may be obtained having a substantially uniform and homogeneous body or consistency, a high level of foaming power and maintenance of the requisite degree of activity of the amide active ingredient upon aging for long periods of time. Various preferred embodiments of the present invention will be apparent in the following description.

Any suitable essentially water-insoluble calcium- and/or magnesium-containing abrasives or polishing agents may be employed in these dental creams. There is a relatively large number of such materials known in the art. Representative materials include, for example, calcium carbonate, dicalcium phosphate either anhydrous or hydrated, tricalcium phosphate, magnesium carbonate, magnesium oxide, calcium sulphate, magnesium silicate, trimagnesium phosphate, etc., including suitable mixtures thereof. It is preferred to use calcium carbonate and/or a calcium phosphate, e. g. dicalcium phosphate, in view of their ease of formulation and the obtention of smooth consistency or body in a dental cream. If desired, these agents may be admixed in part with other suitable polishing agents such as insoluble sodium metaphosphate, aluminum hydroxide, bentonite, etc. In general, these agents will comprise the major proportion by weight of the solid ingredients in the cream. The amount utilized is variable and dependent somewhat upon the specific abrasive effects desired and the specific formulation, but will generally be from about 20–75%, usually about 30–65%, and preferably 40–60% by weight of the dental cream.

As described in U. S. 2,689,170, the suitable active ingredients are the substantially saturated aliphatic acyl amides of a saturated aliphatic monoaminocarboxylic acid compound having 2 to 6 carbon atoms, the aliphatic acyl group having about 12 to 16 carbon atoms. Optimum results are achieved with the dodecanoyl, tetradecanoyl, hexadecanoyl derivatives. These compounds may be produced by the condensation of a higher fatty acylating substance, e. g. lauric acid chloride, with a suitable amino acid compound such as sodium sarcosine. The lower amino acid portion of these active ingredients is generally derived from the said lower aliphatic saturated amino carboxylic acids, such as, for example, those having up to about 6 carbons, usually the monocarboxylic acid derivatives. It is preferred that the compounds be derived from the amino substituted lower alkane carboxylic acids, such as the mono-amino substituted alkane monocarboxylic acids, particularly the alpha amino substituted acids. Suitable amino acids from which the higher fatty amides thereof may be derived are aminoethanoic acid (glycine), methylaminoethanoic acid sarcosine), 2-aminopropanoic acid (alanine), 3-aminopropanoic acid, valine, etc. It is preferred to use the amides of those acids having about 2 to about 5 carbon atoms, and more particularly, the sarcoside and glycide derivatives and their homologues having up to about 5 carbon atoms in the amino acid portion of the molecule in view of the excellent results obtained by their use.

Such amides of the amino carboxylic acid compounds are to be generally employed in the form of their free acids or preferably as the water-soluble salts thereof. In general, the desired salts are the water-soluble carboxylate salts such as the alkali metal (e. g. sodium, potassium, etc.), ammonium, amine, alkylolamine (e. g. mono-, di-, tri-ethanolamine, etc. Preferred amide compounds are those having the formula:

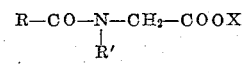

wherein R—CO— is a higher saturated fatty acyl radical of 12 to 16 carbon atoms, R' is selected from the group consisting of hydrogen and lower alkyl, and X is selected from the group consisting of hydrogen and water-soluble salt-forming cations. Further specific examples of suitable active ingredients are sodium N-lauroyl sarcoside, potassium N-lauroyl sarcoside, sodium N-myristoyl sarcoside, sodium N-palmitoyl sarcoside, N-lauroyl sarcosine, sodium N-lauroyl glycide, sodium N-myristoyl glycide, etc. The alkali metal salt derivatives such as sodium and potassium appear to be equally effective and yield usually optimum results in compariston to other water-soluble salts. Optimum effects appear with the lauroyl derivatives though other higher fatty acyl radicals may be used as indicated. For convenience, herein, reference to "amino carboxylic acid compound," "sarcoside," "glycide," etc., refers to such compounds having a free carboxylic group or the water-soluble carboxylic salts.

These active ingredients may be employed in any suitable amount. Such suitable amounts or proportions are known, and their determination per se does not constitute the essential novelty of the present invention. In general, they will be employed in a minor but effective amount, such as up to about five percent by weight of the finished formulation. In practice, it will be sufficient usually to use suitable amounts up to four percent, such as 0.5% to about 4%. Optimum results, wherein the material is effective for an adequate period in the oral cavity and which is usually most conducive to a commercially acceptable dental cream have been achieved with the use of about 1–3% active ingredient. The active ingredient may be added in any suitable form, e. g. as a powder or in solution, during manufacture of the dental cream. It should be suitably dissolved or dispersed in the liquid content or phase however.

Various calcium and magnesium ion suppression agents suitable in the present invention are known in the art. These compounds per se have the property of suppressing or inhibiting the presence of free calcium and magnesium ions in solution, thereby reducing their concentration. Among such agents are calcium and magnesium sequestering agents, chelating agents, etc.

When these agents are incorporated in the dental creams of the present invention, there results an establishment of an equilibrium which tends to render the system more stable upon aging. This protective action against possible chemical and/or physical reactions upon aging of the cream insures the maintenance of the active ingredients in their active state for increased periods of time. The exact mechanisms by which such stabilizing agents function in the present invention are not known at this time in view of the characteristic physical state of a dental cream and the complex solubility relationships existing therein. These materials do aid however in the maintenance of stability of the cream, whether their indicated protective function or power is due to sequestration, chelation, peptizing, removal of reactive ionic material from solution, or by any other specific mechanism.

It is preferred to use the water-soluble phosphate compounds, preferably the polyphosphate materials, usually in the form of their water-soluble inorganic salts. These compounds usually form soluble complexes with calcium or magnesium ions and are often commonly referred to as sequestering agents. Such polyphosphate salts having binding power for calcium and magnesium ions and the like may be considered as derived from orthophosphoric acid or the like by the removal of water through any suitable means of manufacture may be employed if desired. These molecularly-dehydrated polyphosphate salts may be wholly or partially neutralized, such as the alkali metal or ammonium salts of pyrophosphoric, triployphosphoric, tetraphosphoric acids, etc. Suitable examples thereof are tetrasodium pyrophosphate, sodium tripolyphosphate, potassium tripolyphosphate, disodium diacid pyrophosphate, tetrapotassium pyrophosphate, hexasodium tetraphosphate, sodium hexametaphosphate, etc. It is preferred to use the several water-soluble pyrophosphate salts in view of the excellent results obtained by their use in stabilization of the active ingredient, maintenance of high foaming power, ease of formulation, stability of the cream under adverse conditions, etc. Other suitable phosphate materials are the alkali metal salts of orthophosphoric acid such as mono-, di-, and tri-sodium phosphate; the salts commonly referred to as the soluble sodium and potassium metaphosphates, etc.

Other suitable materials such as chelating agents are the water-soluble salts, preferably alkali metal salts, of organic polycarboxylic acids and the like such as ethylene diamine tetraacetic acid, citric acid, etc. Specific examples thereof are sodium citrate, potassium citrate, di-, tri- and preferably tetra-sodium ethylene diamine tetraacetate, etc. There may also be used the similar salts of gluconic acid, e. g. sodium and potassium gluconate.

These stabilizing agents are employed in the indicated minor amount in the dental creams, viz. about 0.1 to 5% by weight. The precise amount will vary depending upon the specific formulation and the physical characteristics of the cream but will usually be from about 0.1% to about 3%, and preferably from about 0.2% to about 2% of the cream. Optimum effects with the phosphate type materials have been obtained with effective concentrations up to about 1% by weight.

The various solid and liquid ingredients are proportioned in known manner to form a substantially uniform and homogeneous creamy mass extrudible from a collapsible tube, such as an aluminum or lead tube. The essentially water-insoluble polishing agents are substantially in suspension, the cream usually being set to a gel or the like. In general, the liquids will comprise chiefly such materials as water, glycerine, sorbitol, propylene glycol, etc., including mixtures thereof. It is advantageous to use a mixture of both water and a humectant such as glycerine, sorbitol, etc., in view of the obtention of good consistency initially and upon storage, improved hygroscopicity and plasticizing action, and solubilization effects. The total liquid content will generally be from about 20 to about 75% and usually 30–65% of the formulation. In liquid mixtures, the glycerine (or the like) and water will usually be from about 5–50% each, and preferably 10–40% each, of the total ingredients which are necessarily proportioned to form a dental cream of desired consistency.

Other adjuvant materials may be similarly incorporated in suitable amounts. It is preferred to use a gelling agent such as the natural and synthetic gums and gum-like materials, e. g. Irish moss, gum tragacanth, sodium carboxymethylcellulose, starch, etc., usually in an amount up to 10% by weight of the dental cream, and preferably from 0.5–5%. Furthermore, such materials as soluble saccharin, flavor oils (e. g. oils of spearmint, peppermint, coloring or whitening agents, preservatives, alcohol, etc. may be used as desired in proper amount.

The following specific examples are further illustrative of the nature of the present invention, but it is to be understood that the invention is not limited thereto. All amounts of the various ingredients are by weight unless otherwise specified.

*Example I.—Dental cream*

A suitable dental cream is prepared having approximately the following formulation:

| | Percent |
|---|---|
| Calcium carbonate | 12.1 |
| Dicalcium phosphate dihydrate | 36.2 |
| Sodium N-lauroyl sarcoside | 2.0 |
| Disodium diacid pyrophosphate | 1.0 |
| Glycerine | 30.6 |
| Water | 15.3 |
| Irish moss | 1.0 |
| Sodium saccharin | 0.15 |
| Sodium benzoate | 0.5 |
| Flavor, q. s. | |

The glycerine, Irish moss, water, saccharin and the minor amounts of preservatives including the pyrophosphates are mixed and heated to about 170° F. to form a gel-like mass. The sarcoside of desired purity as previously described is added with agitation to form a homogeneous mass, after which the polishing agents in powder form are incorporated similarly. After cooling and adding the flavoring material, the mass is milled, deaerated and strained to produce a smooth, homogeneous cream paste, which is subsequently added to collapsible aluminum or lead tubes. This dental cream has a substantially neutral pH value. Extensive testing shows that this dental cream exhibits the desired stability and maintenance of the said acid-inhibiting properties even after long periods of time, with a high level of foaming power.

Instead of the sodium acid pyrophosphate in Example I, the following materials were substituted in equivalent amount resulting in the obtention of dental creams having a high order of stability also: tetrasodium pyrophosphate, sodium tripolyphosphate, sodium hexametaphosphate, sodium citrate, tetra-sodium ethylene diamine tetraacetate, disodium phosphate, trisodium phosphate, sodium metasilicate, etc.

Other suitable formulations productive of desired results are:

*Example II*

| | Percent |
|---|---|
| Sodium N-lauroyl sarcoside | 2.0 |
| Calcium carbonate | 55.0 |
| Disodium diacid pyrophosphate | 0.25 |
| Glycerine | 27.0 |
| Water | 14.0 |
| Gum, flavor, etc., q. s. | |

*Example III*

| | Percent |
|---|---|
| Sodium N-myristoyl sarcoside | 2.0 |
| Dicalcium phosphate dihydrate | 53.5 |
| Tetrasodium pyrophosphate | 1.0 |
| Glycerine | 27.0 |
| Water | 14.0 |
| Gum, flavor, etc., q. s. | |

*Example IV*

| | Percent |
|---|---|
| Sodium N-lauroyl sarcoside | 2.0 |
| Dicalcium phosphate dihydrate | 40.0 |
| Calcium carbonate | 10.0 |
| Sodium citrate | 3.0 |
| Glycerine | 20.0 |
| Water | 20.0 |
| Gum, flavor, etc., q. s. | |

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention what is claimed is:

1. A dental cream comprising (1) a polishing material selected from the group consisting of calcium- and magnesium-containing polishing agents, (2) a substantially saturated aliphatic acyl amide of a saturated aliphatic monoaminocarboxylic acid compound having 2 to 6 carbon atoms, the aliphatic acyl group having about 12 to 16 carbon atoms, and less than about 15% by weight based on said amide of higher fatty acid material, the amount of said material being insufficient to substantially adversely affect said amide, and characterized by (3) a calcium and magnesium ion suppression agent in an amount from about 0.1 to 5% by weight.

2. A dental cream in accordance with claim 1 wherein said agent is a water-soluble inorganic sequestering agent.

3. A dental cream in accordance with claim 1 wherein said agent is a water-soluble organic chelating agent.

4. A dental cream comprising (1) a calcium-containing polishing material, (2) a substantially saturated N-fatty acyl sarcoside having about 12 to 16 carbon atoms in said acyl group, and less than about 15% by weight based on said sarcoside of higher fatty acid material, the amount of said material being insufficient to substantially adversely affect said sarcoside, and characterized by (3) a calcium ion suppression agent in an amount from about 0.1 to 3% by weight.

5. A dental cream in accordance with claim 4 wherein said agent is an alkali metal salt of citric acid.

6. A dental cream comprising (1) a calcium phosphate polishing material, (2) a substantially saturated N-fatty acyl sarcoside having about 12 to 16 carbon atoms in said acyl group, and less than about 15% by weight based on said sarcoside of higher fatty acid material, the amount of said material being insufficient to substantially adversely affect said sarcoside, and characterized by (3) an alkali metal polyphosphate in an amount from about 0.1 to 5% by weight.

7. A dental cream in accordance with claim 6 wherein said polyphosphate is disodium diacid pyrophosphate.

8. A dental cream in accordance with claim 6 wherein said polyphosphate is tetrasodium pyrophosphate.

9. A dental cream comprising (1) dicalcium phosphate polishing material, (2) about 2% sodium N-lauroyl sarcoside having less than about 15% by weight based on said sarcoside of higher faty acid material, the amount of said material being insufficient to substantially adversely affect said sarcoside, and characterized by (3) a sodium pyrophosphate in an amount from about 0.1 to 3% by weight.

References Cited in the file of this patent

UNITED STATES PATENTS

| 1,619,076 | Kuever | Mar. 1, 1927 |
| 2,191,199 | Hall | Feb. 20, 1940 |
| 2,287,699 | Moss et al. | June 23, 1942 |

FOREIGN PATENTS

| 456,142 | Great Britain | Nov. 3, 1936 |
| 459,039 | Great Britain | Dec. 28, 1936 |
| 461,328 | Great Britain | Feb. 15, 1937 |
| 635,522 | Germany | Sept. 18, 1936 |
| 795,052 | France | Dec. 26, 1935 |
| 787,819 | France | July 6, 1935 |
| 675,837 | Germany | May 22, 1939 |
| 490,384 | Great Britain | Aug. 15, 1938 |

OTHER REFERENCES

Soap ("Detergents"), May 1940, pages 35 and 67.

Kosmetische, Reichstoff, U. Parfumerie-Industrie, September 1951, pages 479 and 480.